Figure 3:
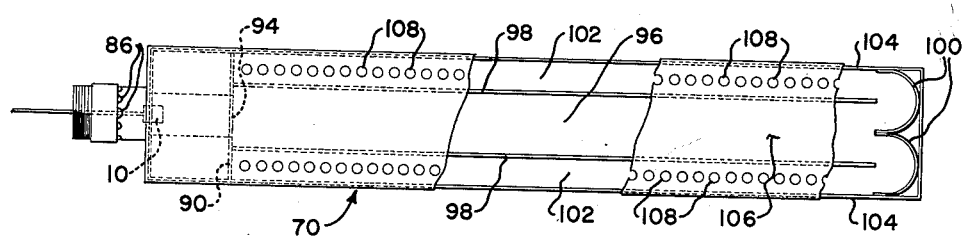

May 5, 1964 O. A. DAVIS, SR 3,131,749
ASPIRATING LIQUID FUEL BURNER
Filed Nov. 18, 1960 2 Sheets-Sheet 1
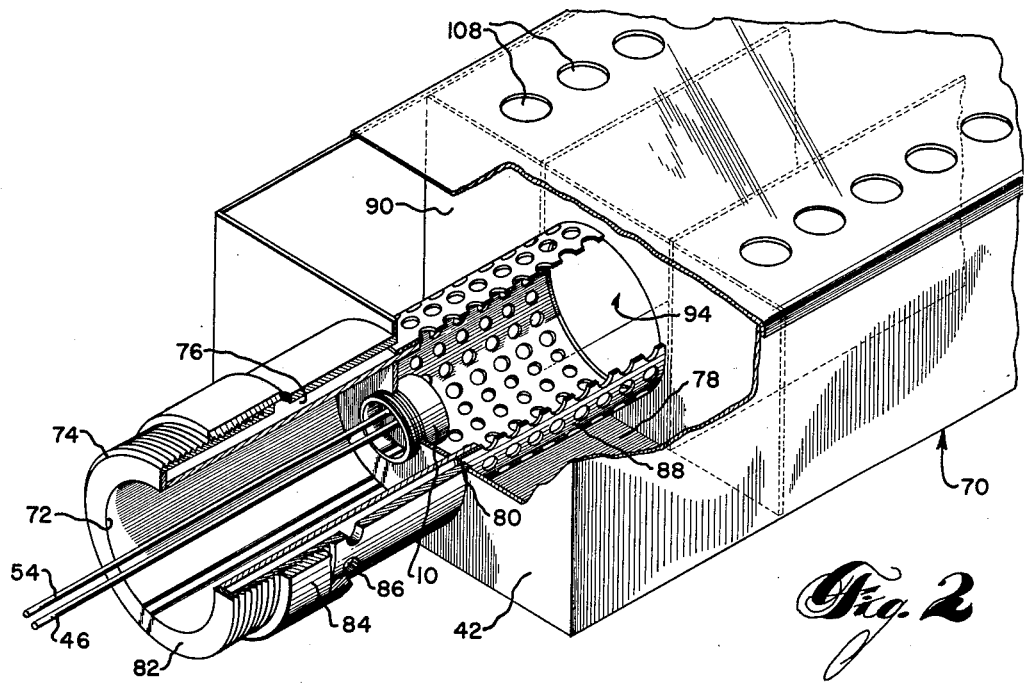
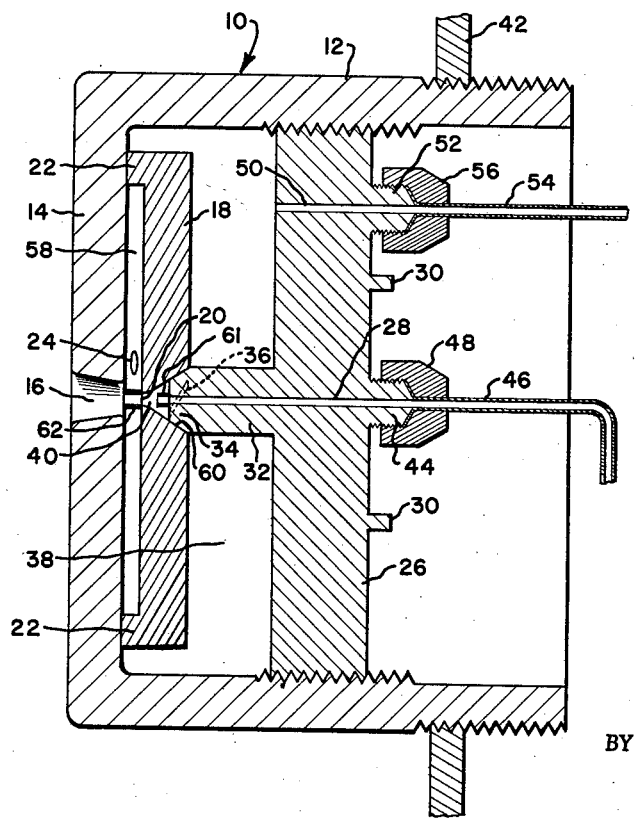
INVENTOR.
ORVIS A. DAVIS, SR.
BY
ATTORNEY

INVENTOR.
ORVIS A. DAVIS, SR.
BY
ATTORNEY

United States Patent Office 3,131,749
Patented May 5, 1964

3,131,749
ASPIRATING LIQUID FUEL BURNER
Orvis A. Davis, Sr., Gibsonia, Pa., assignor to Gulf Research & Development Company, Pittsburgh, Pa., a corporation of Delaware
Filed Nov. 18, 1960, Ser. No. 70,226
3 Claims. (Cl. 158—4)

This invention relates to oil burner apparatus employing an aspirating type nozzle.

The flame produced upon ignition of the spray from the nozzle to which liquid fuel is pumped under pressure has the general characteristics of being widely dispersed, having a deep yellow coloration and being extremely smoky. In order to produce a flame of improved characteristics from this type of nozzle it is necessary for the nozzle to have such a restricted orifice that it generally becomes inoperative due to plugging. On the other hand, a flame of sharply improved characteristics is produced by employing for liquid fuels aspirating type nozzles wherein an aspirating gas such as air or steam and preferably air passes through the nozzle in a manner which creates a suction thereby drawing liquid fuel into the nozzle which admixes with the air to form an atomized fuel-air mixture. The air or other gas used to aspirate oil into such nozzles is employed at the low pressure of about 2 to 10 pounds per square inch gauge while the oil is made available to the nozzle at only atmospheric pressure. Advantageously, the oil is drawn into the nozzle from a level lower than the nozzle so that the oil reaches the nozzle purely by the aspirational effect of the air passing therethrough.

Aspirating nozzles for liquid fuel preferably employ a frusto-conical swirl stem possessing slanted peripheral grooves and disposed in sealing engagement with a corresponding surface inside the nozzle burner. The grooves constitute ducts leading into a swirl chamber whereby a swirling motion is imparted to the aspirating air passing therethrough en route to the swirl chamber. The swirl chamber has an axial discharge orifice restriction at the end opposite the swirl stem and an oil inlet duct extends axially into the swirl chamber a portion of distance from the swirl stem to the discharge orifice. The aspirating air swirling through the swirl chamber draws oil into itself to form a mixture of fuel and air. The air-oil mixture from the swirl chamber is passed through the discharge orifice of the nozzle and upon ignition burns as a compact, elongated, high velocity flame.

Other constructions can be employed in place of a swirl stem for swirling the aspirating air. For example, the aspirating air can be admitted tangentially to a swirl chamber which is circular in transverse cross section through a wall opening. However, no matter what swirling means is employed, when an axial oil inlet duct is employed it must extend at least to an intermediate point along the length of the swirl chamber or else the aspirating gas will not aspirate sufficient oil into the swirl chamber to form a combustible mixture.

The compact, elongated, high velocity flame from the aspirating nozzle burns with a light yellow coloration. The base of the flame starts at a point just slightly outside the discharge orifice of the nozzle and in the case of a nozzle employing air at about 3 pounds per square inch gauge pressure drawing into the nozzle about 0.15 gallon of oil per hour this flame extends for about 12 inches and averages about 1 to 3 inches in diameter. In accordance with this invention an apparatus has been developed to be employed in combination with such a nozzle for sharply altering the flame characteristics. When employing the apparatus of this invention with an aspirating nozzle instead of burning as a high velocity jet the spray from the nozzle is caused to burn uniformly through perforations on the top of an elongated manifold with the characteristics of a flame which would be produced if low pressure gaseous fuel were being passed through the manifold. The apparatus of this invention thereby converts the high velocity, light yellowish, jet type flame to a gently wafting low velocity flame with a light blue hue rising uniformly from perforations along the length of an elongated manifold.

The structure of the apparatus of this invention will be readily understood by reference to the attached drawings in which FIGURE 1 shows the details of a preferred aspirating nozzle and FIGURES 2, 3, 4, 5 and 6 show details of apparatus to be employed in combination with an aspirating nozzle adapted to alter the characteristics of the flame from such a nozzle in the manner described.

Referring to FIGURE 1, a longitudinal cross-sectional view of a nozzle designated generally as 10 is shown having a tubular body portion 12 which is internally and externally threaded as shown. The forward end of body portion 12 terminates with a substantially flat integral enclosure 14 which is on a plane transverse to the axis of tubular body 12. Enclosure 14 has an axial tapered central orifice opening 16. Orifice plate 18 immediately inside of and adjacent to enclosure 14 has an over-all diameter less than the internal diameter of tubular body 12 and has an axial orifice 20. Orifice 20 is the apex of an axial conical bore 60 as shown. The diameter of orifice opening 16 is larger than the diameter of orifice opening 20 and a duct 62 extends from orifice 20 to partially obstruct the entrance to orifice 16. The forwardly protruding peripheral rim 22 of orifice plate 18 contains one or more borings 24 which open in a tangential manner into swirl chamber 58 which is formed by virtue of rim 22 setting apart the rearward surface of enclosure 14 and the forward surface of orifice plate 18.

A plug 26 having external threads and an axial bore 28 is equipped with two or more prongs 30 on its rear face so that it can be screwed into the interior of tubular body 12 and urge orifice plate 18 in sealing engagement against the inner surface of enclosure 14 so that orifice opening 20 is axially disposed. Plug 26 has a central forwardly projecting stud 32 terminating with a frusto-conical swirl stem 34 which holds orifice plate 18 in place by abutting firmly against the complementary internal surface of the base portion of conical bore 60 leaving unoccupied the apex of conical bore 60, the unoccupied apex of conical bore 60 constituting a swirl chamber 40. Swirl stem 34 is equipped with one or more peripheral slots 36 extending the length of the stem and providing passage between air chamber 38 and swirl chamber 40. Slots 36 are generally comparable in cross section and length with borings 24 so that the pressure drop through each is generally the same. In one example, slots .030 inch square are employed. Bore 28 which is coaxial with tubular body 12 constitutes a connecting passageway for the suction of oil from an oil reservoir on a lower level, not shown, into swirl chamber 40. Bore 28 is extended through a portion of the length of swirl chamber 40 by means of tube 61.

After the orifice plate 18 is secured in position by tightly screwing plug 26 into place as shown in FIGURE 1, the entire resulting nozzle assembly is secured into position for use by screwing tubular body 12 into wall 42 of the flame chambers shown in FIGURES 2, 3, 4 and 5. After the nozzle is assembled and secured into place, an oil reservoir on a level lower than the nozzle is connected to the nozzle at externally threaded boss 44 extending rearwardly from the center of plug 26 and coaxial with oil passageway 28. Suitable flared tubing 46 extends from below the level of oil in the reservoir and is attached in sealing connection to boss 44 by means of nut 48. Passage of compressed air to chamber 38 is provided by passageway 50 through plug 26 terminating with rearwardly extending externally threaded boss 52 to which flared tubing 54 is attached in sealing connection by means of internally threaded nut 56.

In operating the nozzle shown in FIGURE 1 air under a pressure between about 2 and 10 pounds per square inch gauge, pressures in the upper portion of this range being employed when it is desired to aspirate greater quantities of fuel oil than are aspirated at air pressures in the lower portion of this range, is charged to air chamber 38 from which it passes through groove 36 and enters swirl chamber 40 substantially tangentially and swirls in swirl chamber 40. The swirling air draws oil from a reservoir which is on a lower level than the nozzle by suction through passageway 28 into swirl chamber 40 where a fuel-air mixture is formed which passes through orifice 20 and duct 62 to a second orifice 16. Tube 61 allows the air to assume an adequate swirling pattern prior to aspirating in oil and prevents air back pressure against the oil from the reservoir. Secondary air from air chamber 38 passes through tangential inlet ducts 24 to second swirl chamber 58 from which it swirls through orifice 16 where it increases in velocity and aspirates into itself the fuel-air mixture from duct 62 to form a new mixture in which the oil is more highly atomized and which is richer in air. The new mixture is discharged in a swirling pattern through orifice opening 16.

It has been found that ducts 61 and 62, which project axially a portion of the distance into each swirl chamber, are essential to operation of the nozzle and in the absence of either or both of these ducts the air was unable to aspirate sufficient oil into itself to create a mixture of oil and air capable of sustaining combustion.

In FIGURE 2 aspirating nozzle 10 is shown supported centrally of and extending through end wall 42 of burner chamber 70. Nozzle 10 is supplied with asiprating air under a pressure between about 2 and 10 pounds per square inch gauge through tube 54 and is supplied with oil under atmospheric pressure by aspiration through tube 46. Extending rearwardly from end wall 42 and coaxial with nozzle 10 are inner and outer cylinders 72 and 74, respectively, defining an annular space 76 between them. Annular space 76 is enclosed on its rearward end by a circular plate 82 and on its forward end opens through aperture 80 into zone 78 of combustion chamber 70.

A collar 84 is in threaded engagement with cylinder 74 and is adapted to adjust the openings of air inlet ports 86 extending through cylinder 74. Such adjustment regulates the amount of air available for combustion of the spray from nozzle 10 in addition to the aspirating air which reaches the nozzle through tube 54. It is noted that sufficient air should pass through ports 86 to prevent flame extinguishment but not sufficient air for complete combustion, allowing ambient air to satisfy combustion requirements above perforations 108 as will be apparent hereinafter. The air entering through ports 86 travels forwardly through annular space 76 and aperture 80 into the zone 78 from which it travels through the perforations in flame tube 88, being prevented by means of plate 90 from passing lengthwise through tube 70 except through flame tube 88.

Flame tube 88 extends forwardly from end wall 42 coaxially surrounding nozzle 10 and is of a smaller diameter than the inner diameter of aperture 80 whereby the secondary air enters combustion chamber 70 on the outside of flame tube 88 so that in its inward travel through the perforations in flame tube 88 it serves to confine the spray from nozzle 10. The end of flame tube 88 is coextensive with respect to the periphery of opening 94 through which the flame from nozzle 10 passes in its travel to central passageway 96 of combustion chamber 70. Passageway 96 is indcated in FIGURE 3.

Referring to FIGURE 3, central passageway 96 is defined between a pair of parallel baffles 98 extending from plate 90 the major portion of the length of the chamber 70. Baffles 98 terminate before the pair of flame deflectors 100 which are disposed at the forwardmost end of combustion chamber 70. Baffles 98 also define a pair of elongated outer chambers 102 between themselves and side walls 104 of combustion chamber 70. Combustion chamber 70 is provided with a top enclosure 106 shown in partially cut away view and having two rows of elongated opening means such as perforated openings 108. One row of perforated openings 108 extends adjacent to one of the longest sides of top enclosure 106 while the other row extends adjacent to the opposite of the longest sides of top enclosure 106 and each is located so as to be disposed substantially centrally of each of corresponding zones 102. As is clearly shown in FIGURES 2 and 3, each opening 108 leads from its corresponding zone 102 directly to the exterior of combustion chamber 70.

The flame produced upon ignition of the spray from nozzle 10 by means of a suitable igniter, not shown, is supplied with auxiliary air from ports 86 and travels through opening 94 along the length of central zone 96 which extends substantially the length of the flame. The flame is divided into approximately two equal portions at flame deflectors 100 each portion being deflected sideways and backwards through the side chambers 102. A wafting flame similar in appearance to that of a low pressure gaseous fuel rises from the perforations 108 so that two rows of flame of a soft blue hue appears at the top of burner chamber 70, the columns of flame respectively extending along each of the longest sides of the burner chamber 70.

A difficulty which sometimes arises in operation of the flame chamber shown in FIGURE 3 is that the height of the flame emerging from the perforations 108 is highest at the perforations closest to the forward end of burner chamber 70 and the height of the flame uniformly diminishes so as to be barely perceptible at the perforations closest to the rearward end of burner chamber 70. This difficulty is advantageously corrected by means of the embodiment shown in FIGURE 4 and is most advantageously corrected by means of the embodiment shown in FIGURE 5.

Figure 4:
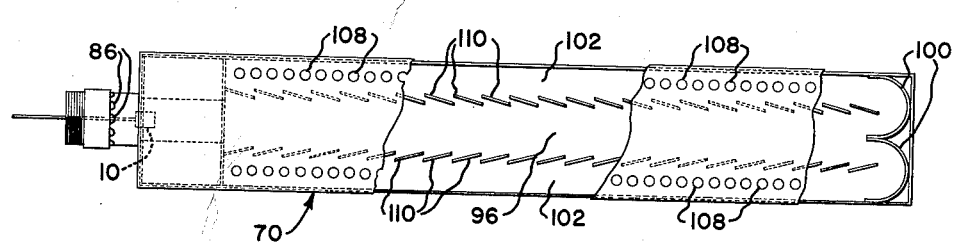

As shown in FIGURE 4 flame chamber 70 is provided with two parallel rows of louvers 110 in place of solid baffles 98. Louvers 110 may be otherwise described as slatted panels or slanted baffles. Louvers 110 are slanted so that passages between adjacent louvers extend outwardly and rearwardly from central zone 96 whereby the flame passing from nozzle 10 through the longitudinal central zone 96 is not deflected in transit and whereby the gases in side zones 102 which are moving countercurrently to the gases in central zone 96 are likewise not deflected in transit. The zone 96 and zones 102 are sufficiently narrow in relation to the flame so that the passage of the flame through central zone 96 creates an aspirational effect through the louvers 110 whereby the flame reaching deflectors 100 tends to be drawn back the entire length of side zones 102. Such is evidenced by the observation that the height of the flame rising from perforations 108 is substantially uniform in each row of perforations along the entire length of combustion chamber 70.

Figure 5:
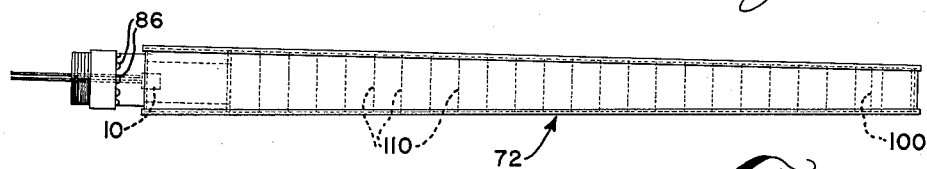

Combustion chamber 72 shown in elevation in FIGURE 5 in combination with the louvers 110 of FIGURE 4 represents the most preferred embodiment of this invention. Combustion chamber 72 is tapered in the manner shown so that its height becomes uniformly smaller with increasing distance from the nozzle end. It is noted that the taper in the embodiment of FIGURE 5 is accomplished with the top of the chamber 72 remaining horizontal so that the plurality of flames from chamber 72 will rise to a common horizontal plane. Also, the two rows of louvers 110 in FIGURE 5 can uniformly approach each other with increasing distance from the nozzle. It is seen that if the chamber 70 of FIGURE 4 is altered to possess the taper of chamber 72 of FIGURE 5, the inner zone 96 through which the flame from the nozzle passes becomes uniformly smaller in transverse cross section with increasing distance from the nozzle thereby tending to sharply increase the velocity of flame gases in the region of deflectors 100 and thereby giving added impetus to the movement of combustion gases countercurrently through side zones 102. The combination of increased velocity due to the tapered configuration of combustion chamber 72 and the aspirational effect due to the louvers 110 produces a highly uniform flame in each row of perforations 108 along the entire length of the combustion chamber so that there is no perceptible difference in flame height, intensity or color from the perforations at one end of either row of perforations to the opposite end.

Louvers 110 in addition to providing an aspirational effect tending to draw combustion gases the entire length of side zones 102 as shown in FIGURE 4 tend to serve still another advantageous function in that while gases in the side zones 102 tend to rise through the openings 108 at the top of the combustion chamber and burn in passage through these openings any entrained and unburned droplets of oil, being too heavy to rise through openings 108, tend to be drawn through the slatted openings in louvers 110 back to chamber 96 thereby avoiding buildup of oily deposits and soot in the apparatus.

Figure 6:
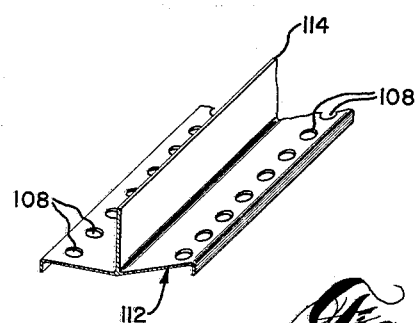

FIGURE 6 shows a preferred construction for a top plate for the combustion chamber apparatus of this invention. As shown in FIGURE 6 top plate 112 has each row of perforations 108 on a plane inclined so that the flames rising from the opposite rows tend to intercept each other. This provides the advantage that furnace walls or other equipment are not subjected to a direct or even glancing flames. It was found that directing each row of flame to each other in this manner caused the flame to assume a yellow discoloration evidencing incomplete combustion but this was corrected by employing a baffle 114 between the two rows of openings 108 whereupon the flame again assumed its light blue coloration.

Various changes and modifications may be made without departing from the spirit of this invention and the scope thereof as defined in the following claims.

I claim:

1. An apparatus comprising in combination an elongated enclosed flame chamber and an oil aspirating spray nozzle, said aspirating nozzle adapted so that a pressurized gas passing therethrough aspirates liquid fuel through the nozzle, inlet opening means disposed at the rearward end of said flame chamber, said oil aspirating nozzle disposed to spray into said flame chamber through said inlet opening means, partitioning means comprising a plurality of adjacent louvers extending row-like along the length of said flame chamber, said partitioning means dividing said chamber lengthwise into separate elongated zone means, access means between said separate zone means at the end of said elongated flame chamber remote from said oil aspirating nozzle, a first of said zone means in register with said inlet opening means, passageway means between adjacent louvers in said partitioning means extending outwardly and rearwardly from said first zone means to a second of said zone means, and overhead discharge opening means in said enclosed chamber in register with said second zone means extending along the length of said second zone means, said overhead discharge opening means leading from said second zone means directly to the exterior of said apparatus.

2. An apparatus comprising in combination an elongated enclosed flame chamber and an oil aspirating spray nozzle, said aspirating nozzle adapted so that a pressurized gas passing therethrough aspirates liquid fuel through the nozzle, inlet opening means disposed at the rearward end of said flame chamber, said oil aspirating nozzle disposed to spray into said flame chamber through said inlet opening means, partitioning means comprising a plurality of adjacent louvers extending row-like along the length of said flame chamber, said partitioning means dividing said chamber lengthwise into central elongated zone means and outer elongated zone means, access means between said central zone means and said outer zone means at the end of said elongated flame chamber remote from said oil aspirating nozzle, said central zone means in register with said inlet opening means, passageway means between adjacent louvers in said partitioning means extending outwardly and rearwardly from said central zone means to said outer zone means, and overhead discharge opening means in said enclosed chamber in register with said outer zone means extending along the length of said outer zone means, said overhead discharge opening means leading from said outer zone means directly to the exterior of said apparatus.

3. An apparatus comprising in combination an elongated enclosed flame chamber and an oil aspirating spray nozzle, said oil aspirating nozzle adapted so that a pressurized gas passing therethrough aspirates liquid fuel through the nozzle, inlet opening means disposed at the rearward end of said flame chamber, said oil aspirating nozzle disposed to spray into said flame chamber through said inlet opening means, a pair of parallel partitioning means extending lengthwise within said flame chamber, each partitioning means comprising a plurality of adjacent louvers extending row-like along the length of said flame chamber, said partitioning means dividing said chamber lengthwise into separate elongated zone means including a central zone means and side zone means, access means between said central zone means and said side zone means at the end of said elongated flame chamber remote from said oil aspirating nozzle, said central zone means in register with said inlet opening means, passageway means between adjacent louvers in said partitioning means extending outwardly and rearwardly from said central zone means to each of said side zone means, and overhead discharge opening means in said enclosed chamber in register with said side zone means so that each of said side zone means has respective overhead discharge opening means extending along its length, each of said overhead discharge opening means leading from its respective side zone means directly to the exterior of said apparatus.

References Cited in the file of this patent

UNITED STATES PATENTS

| | | |
|---|---|---|
| 2,189,532 | Garson et al. | Feb. 6, 1940 |
| 2,755,851 | Dow et al. | July 14, 1956 |
| 2,993,479 | Thurley | July 25, 1961 |

FOREIGN PATENTS

| | | |
|---|---|---|
| 520,240 | Belgium | Nov. 27, 1953 |
| 825,859 | Great Britain | Dec. 23, 1959 |
| 578,880 | France | July 17, 1924 |
| 806,177 | France | Sept. 14, 1936 |
| 147,174 | Sweden | Oct. 5, 1954 |